United States Patent
Yang et al.

(10) Patent No.: US 11,018,597 B2
(45) Date of Patent: May 25, 2021

(54) FLYBACK POWER CONVERTER CIRCUIT AND CONTROL CIRCUIT AND CONTROL METHOD THEREOF

(71) Applicant: RICHTEK TECHNOLOGY CORPORATION, Zhubei (TW)

(72) Inventors: Ta-Yung Yang, Zhubei (TW); Chao-Chi Chen, Zhubei (TW); Chen-Hung Tsai, Zhubei (TW); Chuh-Ching Li, Zhubei (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/783,224

(22) Filed: Feb. 6, 2020

(65) Prior Publication Data

US 2020/0358367 A1    Nov. 12, 2020

Related U.S. Application Data

(60) Provisional application No. 62/844,836, filed on May 8, 2019.

(30) Foreign Application Priority Data

Aug. 19, 2019    (TW) ................................. 108129437

(51) Int. Cl.
*H02M 7/21*    (2006.01)
*H02M 1/00*    (2006.01)

(52) U.S. Cl.
CPC ............... *H02M 7/21* (2013.01); *H02M 1/00* (2013.01); *H02M 2001/0006* (2013.01); *H02M 2001/0025* (2013.01)

(58) Field of Classification Search
CPC ............ H02M 7/00; H02M 7/02; H02M 7/12; H02M 7/21; H02M 1/00; H02M 2001/0006; H02M 2001/0025; H02M 2001/003
See application file for complete search history.

(56) References Cited

U.S. PATENT DOCUMENTS

| | | | |
|---|---|---|---|
| 5,903,452 A * | 5/1999 | Yang | ................. H02M 3/33507 363/131 |
| 10,034,336 B1 * | 7/2018 | Ye | .......................... H05B 45/10 |
| 2017/0126139 A1 * | 5/2017 | He | ..................... H02M 3/33561 |
| 2020/0036280 A1 * | 1/2020 | Yang | ................. H02M 3/33523 |

* cited by examiner

*Primary Examiner* — Adolf D Berhane
(74) *Attorney, Agent, or Firm* — Tung & Associates

(57) ABSTRACT

A flyback power converter circuit includes: a transformer; a primary side switch, for controlling a primary winding to convert an input voltage to an output voltage and an internal voltage; a primary side control circuit, which is powered by the internal voltage; the primary side control circuit generates a switching signal according to a feedback signal, to operate the primary side switch; a secondary side control circuit, which generates the feedback signal according the output voltage; and a dummy load circuit, which is coupled to the output voltage, wherein when the output voltage drops to or is lower than a predetermined threshold, the dummy load circuit generates a dummy load current, to determine the feedback signal, so that the internal voltage is not undesirably low. When the output voltage exceeds the predetermined threshold, the dummy load circuit adjusts the dummy load current to zero current.

20 Claims, 3 Drawing Sheets

FLYBACK POWER CONVERTER CIRCUIT AND CONTROL CIRCUIT AND CONTROL METHOD THEREOF

CROSS REFERENCE

The present invention claims priority to US 62/844836 filed on May 8, 2019 and claims priority to TW 108129437 filed on Aug. 19, 2019.

BACKGROUND OF THE INVENTION

Field of Invention

The present invention relates to a flyback power converter circuit; particularly, it relates to such flyback power converter circuit having a dummy load circuit. The present invention also relates to a control circuit and a control method for use in such flyback power converter circuit.

Description of Related Art

A prior art flyback power converter circuit is configured to convert an input voltage to an output voltage. The prior art flyback power converter circuit includes a transformer which includes a primary winding, a secondary winding and typically an auxiliary winding, which are coupled to one another via electromagnetic induction. The primary winding is electrically coupled to the input voltage.

A switching signal operates a primary side switch, to control an ON-period of the primary winding, thus generating the output voltage at the secondary winding and an internal voltage at the auxiliary winding. The internal voltage supplies power to a primary side control circuit. The primary side control circuit is configured to operably generate the switching signal according to the output voltage, so as to regulate the output voltage to a predetermined target level. To ensure that the primary side control circuit is in normal operation so that the generated switching signal can regulate the output voltage as desired, it is required for the internal voltage to be kept not lower than an internal voltage threshold.

In addition, depending upon the application circumstances, in certain case the target level of the output voltage is adjustable; for example, under a situation where a load circuit coupled to the output voltage is in alight load condition or a no-load condition, the target level of the output voltage can be lowered. However, because the primary side control circuit generates the switching signal according to the output voltage, rather than according to the internal voltage, when the target level of the output voltage is lowered, there is a high likelihood that the duty ratio of the switching signal will become too low. Consequently and undesirably, the internal voltage will be lower than the internal voltage threshold, thus causing the primary side control circuit to fail to carry out normal operation.

Furthermore, under a circumstance where the primary side control circuit generates the switching signal to operate the primary side switch such that the output voltage is regulated at the target level, because the output voltage is coupled to the load circuit which is in a light load condition or a no-load condition, the duty ratio of the switching signal will be low, that is, the ON-period the switching signal which is a pulse width modulation (PWM) signal is short, whereas, the OFF-period of the PWM signal is long. Consequently and undesirably, during the OFF-period of the PWM signal, although the output voltage remains at the target level, the internal voltage will be lower than the internal voltage threshold, thus causing the primary side control circuit to fail to carry out normal operation. The term "light load condition" as used herein means that the power consumption of the load circuit is lower than the power required for keeping the internal voltage not lower than the internal voltage threshold.

In brief, when the target level of the output voltage is lower than a certain level and the output voltage is coupled to a load circuit which is in a light load condition or a no-load condition, the internal voltage will fail to remain at the internal voltage threshold, whereby the primary side control circuit will fail to carry out normal operation.

In view of the above, to overcome the drawbacks in the prior art, the present invention proposes a flyback power converter circuit having a dummy load circuit. The present invention can ensure that the internal voltage remains not lower than the internal voltage threshold. The present invention also proposes a control circuit and a control method for use in such flyback power converter circuit.

SUMMARY OF THE INVENTION

From one perspective, the present invention provides a flyback power converter circuit, comprising: a transformer including a primary winding, a secondary winding and an auxiliary winding, which are coupled to one another via electromagnetic induction, wherein the primary winding is electrically coupled to an input voltage; a primary side switch coupled to the primary winding, the primary side switch being configured to operably switch the primary winding, so as to convert the input voltage to an output voltage at the secondary winding and convert the input voltage to an internal voltage at the auxiliary winding; a primary side control circuit, which is powered by the internal voltage, the primary side control circuit being configured to operably generate a switching signal according to a feedback signal, to operate the primary side switch; a secondary side control circuit, which is configured to operably generate the feedback signal according to the output voltage; and a dummy load circuit, which is coupled to the output voltage, wherein when the output voltage drops to or is lower than a predetermined voltage threshold, the dummy load circuit is configured to operably generate a dummy load current flowing through the dummy load circuit, to determine the feedback signal, so that the internal voltage is not lower than an internal voltage threshold; wherein when the output voltage exceeds the predetermined voltage threshold, the dummy load circuit is configured to operably adjust the dummy load current to zero current.

From another perspective, the present invention provides a control circuit for use in a flyback power converter circuit, the control circuit being configured to operably control the flyback power converter circuit; the control circuit comprising: a primary side control circuit, which is powered by an internal voltage, the primary side control circuit being configured to operably generate a switching signal according to a feedback signal, to operate a primary side switch; wherein the primary side switch is coupled to a primary winding of a transformer, wherein the primary side switch is configured to operably switch the primary winding, so as to convert the input voltage to an output voltage at a secondary winding of the transformer and convert the input voltage to the internal voltage at an auxiliary winding of the transformer; a secondary side control circuit, which is configured to operably generate the feedback signal according to the output voltage; and a dummy load circuit, which is coupled to the output voltage, wherein when the output voltage drops to or is lower than a predetermined voltage threshold, the dummy load circuit is configured to operably generate a dummy load current flowing through the dummy load circuit, to determine the feedback signal, so that the internal voltage is not lower than an internal voltage threshold; wherein when the output voltage exceeds the predetermined voltage threshold, the dummy load circuit is configured to operably adjust the dummy load current to zero current.

In one embodiment, when the output voltage is lower than the predetermined voltage threshold, the dummy load circuit adaptively adjusts the dummy load current, to determine the feedback signal.

In one embodiment, the secondary side control circuit includes: a secondary side voltage divider circuit, which is connected in parallel with the dummy load circuit, wherein the secondary side voltage divider circuit and the dummy load circuit are commonly electrically connected to the output voltage, wherein the secondary side voltage divider circuit is configured to operably generate a secondary side divided voltage according to the output voltage; and a secondary side comparison circuit coupled to the secondary side voltage divider circuit, the secondary side comparison circuit being configured to operably compare the secondary side divided voltage with a secondary side reference voltage, to generate the feedback signal.

In one embodiment, the flyback power converter circuit further comprises: a coupler circuit coupled between the primary side control circuit and the secondary side control circuit, wherein the coupler circuit is configured to operably convert the feedback signal to a coupled signal via a non-contact way, wherein the coupled signal is inputted to the primary side control circuit.

In one embodiment, the dummy load circuit includes: a first buffer circuit, which is configured to operably generate a dummy output voltage according to the output voltage; a second buffer circuit, which is configured to operably generate a dummy reference voltage according to the predetermined voltage threshold; and an impedance circuit coupled between the first buffer circuit and the second buffer circuit, wherein the impedance circuit is configured to operably generate the dummy load current according to a voltage difference between the dummy output voltage and the dummy reference voltage.

In one embodiment, the first buffer circuit includes: a dummy voltage divider circuit, which is configured to operably generate the dummy output voltage according to the output voltage; and a first unit gain buffer circuit coupled to the dummy voltage divider circuit, wherein first unit gain buffer circuit is configured to operably supply the dummy output voltage to a first terminal of the impedance circuit.

In one embodiment, the second buffer circuit includes: a second unit gain buffer circuit coupled to the impedance circuit, wherein second unit gain buffer circuit is configured to operably supply the dummy reference voltage to a second terminal of the impedance circuit.

In one embodiment, the impedance circuit includes: a resistor having two terminals which are the first terminal and the second terminal; and a current mirror circuit coupled to the resistor, wherein the current mirror circuit is configured to operably generate the dummy load current according to a current flowing through the resistor.

From yet another perspective, the present invention provides a control method for controlling a flyback power converter circuit; the control method comprising: generating a switching signal according to a feedback signal, to operate a primary side switch; wherein the primary side switch is coupled to a primary winding of a transformer, wherein the primary side switch is configured to operably switch the primary winding, so as to convert an input voltage to an output voltage at a secondary winding of the transformer and convert the input voltage to an internal voltage at an auxiliary winding of the transformer; generating the feedback signal according to the output voltage; when the output voltage drops to or is lower than a predetermined voltage threshold, generating a dummy load current, to determine the feedback signal, so that the internal voltage is not lower than an internal voltage threshold; and when the output voltage exceeds the predetermined voltage threshold, adjusting the dummy load current to zero current.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
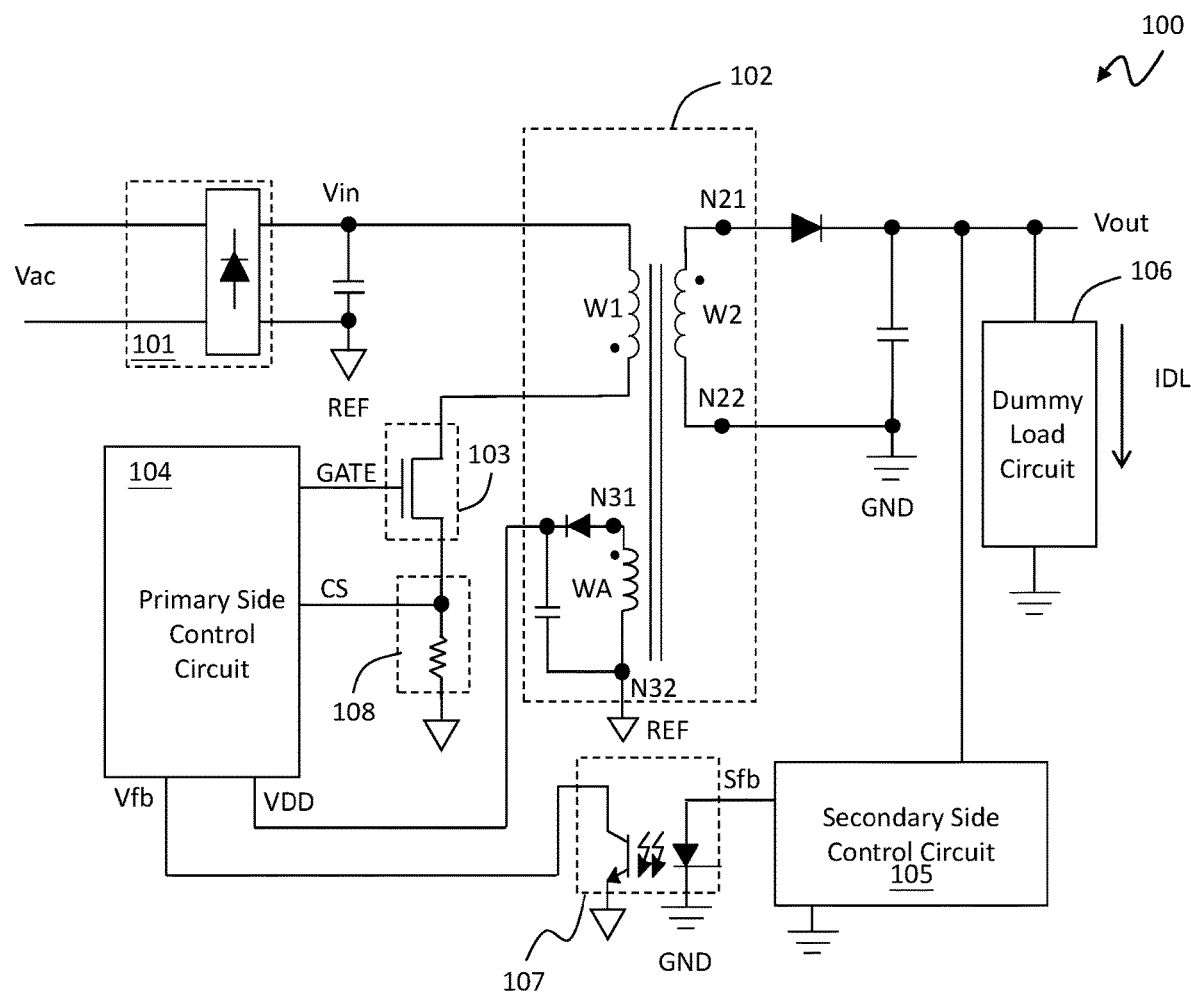
FIG. 1 shows a schematic diagram of a flyback power converter circuit having a dummy load circuit according to an embodiment of the present invention.

Please refer to FIG. 1, which shows a schematic diagram of a flyback power converter circuit (i.e., flyback power converter circuit 100) having a dummy load circuit according to an embodiment of the present invention. The flyback power converter circuit 100 of the present invention comprises: a rectifier circuit 101, a transformer 102, a primary side switch 103, a primary side control circuit 104, a secondary side control circuit 105, a dummy load circuit 106, a coupler circuit 107 and a current sensing circuit 108. An AC voltage Vac is rectified by the rectifier circuit 101, to generate an input voltage Vin. The rectifier circuit 101 can be, for example but not limited to, a bridge rectifier circuit. In the flyback power converter circuit 100, the transformer 102 includes a primary winding W1, a secondary winding W2 and an auxiliary winding WA, which are coupled to one another via electromagnetic induction. The primary winding W1 is electrically coupled to the input voltage Vin and receive the input voltage Vin. The primary side switch 103 is coupled to the primary winding W1. The primary side switch 103 is configured to operably switch the primary winding W1, so as to control an ON-period of the primary winding W1, thereby generating an output voltage Vout between a node N21 and a node N22 (the node N22 is electrically connected to a secondary side ground voltage level GND) of the secondary winding W2 and generating an internal voltage VDD between a node N31 and a node N32 (the node N32 is electrically connected to a reference voltage level REF which is a primary side ground voltage level) of the auxiliary winding WA. The internal voltage VDD supplies power to the primary side control circuit 104.

The primary side control circuit 104 is at a primary side of the transformer 102 and is powered by the internal voltage VDD. The primary side control circuit 104 is configured to operably generate a switching signal GATE according to a coupled feedback signal Vfb which is generated from a feedback signal Sfb, and the generated switching signal GATE is used to operate the primary side switch 103. In addition to generating the switching signal GATE according to the coupled feedback signal Vfb, the primary side control circuit 104 can generate the switching signal GATE further according to a current sensing signal CS generated by the current sensing circuit 108, which generates the current sensing signal CS by sensing a current flowing through the primary side switch 103.

The secondary side control circuit 105 is at a secondary side of the transformer 102. The secondary side control circuit 105 is configured to operably receive the output voltage Vout and generate the feedback signal Sfb according to the output voltage Vout. The coupler circuit 107 is coupled between the primary side control circuit 104 and the secondary side control circuit 105. The coupler circuit 107 is configured to operably convert the feedback signal Sfb to the coupled feedback signal Vfb via a non-contact way, and the coupled feedback signal Vfb is inputted to the primary side control circuit 104. In this embodiment, the coupler circuit 107 can be, for example but not limited to, an opto-coupler circuit as shown in FIG. 1. It should be understood that the implementation of the coupler circuit 107 as an opto-coupler circuit is only one possible embodiment, but not for limiting the scope of the present invention. In other embodiments, it is also practicable and within the scope of the present invention that the coupler circuit 107 can be a transformer, as long as non-contact signal transmission between the primary and secondary sides can be achieved.

The dummy load circuit 106 is coupled to the output voltage Vout. When the output voltage Vout drops to or is lower than a predetermined voltage threshold Vth, the dummy load circuit 106 is configured to operably generate a dummy load current IDL flowing through the dummy load circuit 106, to determine the feedback signal Sfb. The primary side control circuit 104 generates the switching signal GATE according to the coupled feedback signal Vfb which is related to the feedback signal Sfb, to operate the primary side switch 103. As a result, the primary side switch 103 can control an ON-period of the primary winding W1 of the transformer 102, so as to convert the input voltage Vin to the output voltage Vout and the internal voltage VDD, whereby the internal voltage VDD is kept not lower than an internal voltage threshold Vdth.

Figure 2:
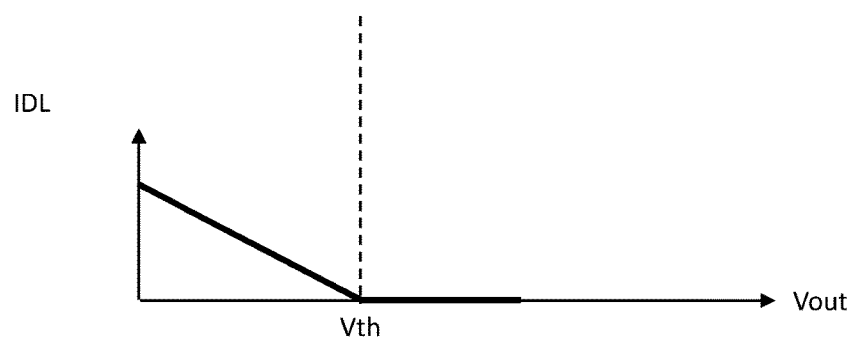
FIG. 2 shows a waveform of a dummy load current versus an output voltage.

In one embodiment, when the output voltage Vout is lower than the predetermined voltage threshold Vth, the dummy load circuit 106 can adaptively adjust the dummy load current IDL, to determine the feedback signal Sfb. For example, please refer to FIG. 2, which shows a waveform of the dummy load current IDL versus the output voltage Vout. As shown in FIG. 2, when the output voltage Vout is lower than the predetermined voltage threshold Vth, the dummy load circuit 106 adjusts the dummy load current IDL so that the dummy load current IDL is negatively correlated with the output voltage Vout. In other words, the dummy load circuit 106 will adaptively raise the dummy load current IDL so that the dummy load current IDL becomes higher when the output voltage Vout become smaller. As a result, the ON-period of a PWM signal of the switching signal GATE will be long enough to ensure the internal voltage VDD not to be lower than the internal voltage threshold Vdth, so that the primary side control circuit 104 can remain in normal operation.

In addition, when the output voltage Vout exceeds the predetermined voltage threshold Vth, the dummy load circuit 106 is configured to operably adjust the dummy load current IDL to zero current, so that the dummy load circuit 106 and the output voltage Vout are in open-circuit connection, i.e., the dummy load current IDL is cut off. Consequently, under a circumstance where the target level of the output voltage Vout exceeds the predetermined voltage threshold Vth, because it is unlikely for the internal voltage VDD to be lower than the internal voltage threshold Vdth, by cutting off the dummy load current IDL of the dummy load circuit 106, power loss as a result of a substantial dummy load current IDL can be avoided.

The present invention is advantageous over the prior art in that: under a circumstance where the output voltage Vout exceeds the predetermined voltage threshold Vth, because the internal voltage VDD is not lower than the internal voltage threshold Vdth, the dummy load current IDL can be cut off to avoid unnecessary power loss, while under a circumstance where the output voltage Vout does not exceed the predetermined voltage threshold Vth, the dummy load circuit 106 can generate the dummy load current IDL to raise up a duty ratio of the switching signal GATE, thereby ensuring the internal voltage VDD to remain not lower than the internal voltage threshold Vdth. In one embodiment, preferably, when the output voltage Vout becomes smaller, the dummy load circuit 106 will adaptively raise the dummy load current IDL, to precisely control the power loss caused by the dummy load current IDL so that there is no unnecessary waste of power.

Note that, in the present invention, the primary side of the transformer 102 is the side where the primary winding W1 of the transformer 102 is located, and the circuits at the primary side of the transformer 102 are commonly electrically connected to the reference voltage level REF; the secondary side of the transformer 102 is the side where the secondary winding W2 of the transformer 102 is located, and the circuits at the secondary side of the transformer 102 are commonly electrically connected to the ground voltage level GND. The coupler circuit 107 is coupled between the primary side and the secondary side.

Figure 3:
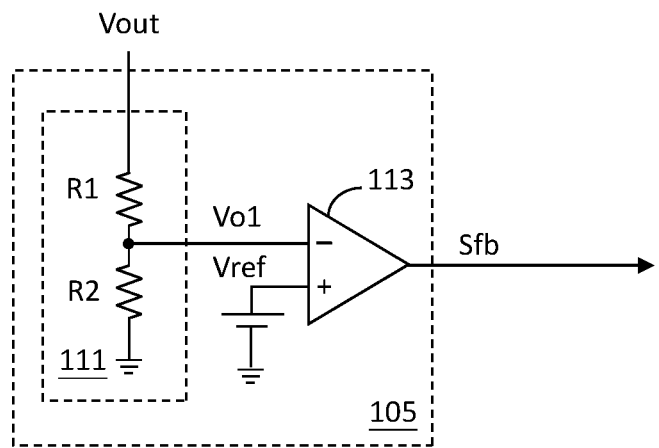
FIG. 3 shows an embodiment of a secondary side control circuit.

Please refer to FIG. 3, which shows an embodiment of a secondary side control circuit 105. As shown in FIG. 3, the secondary side control circuit 105 includes: a secondary side voltage divider circuit 111 and a secondary side comparison circuit 113. The secondary side voltage divider circuit 111 includes a resistor R1 and a resistor R2, which are connected in series to each other. The secondary side voltage divider circuit 111 is connected in parallel with the dummy load circuit 106. The secondary side voltage divider circuit 111 and the dummy load circuit 106 are commonly electrically connected to the output voltage Vout. The secondary side voltage divider circuit 111 is configured to operably generate a secondary side divided voltage Vol according to a divided voltage (of the output voltage Vout) at a voltage dividing node of the resistor R1 and the resistor R2. The secondary side comparison circuit 113 is coupled to the secondary side voltage divider circuit 111. The secondary side comparison circuit 113 is configured to operably compare the secondary side divided voltage Vol with a secondary side reference voltage Vref, to generate the feedback signal Sfb. In this embodiment, the secondary side divided voltage Vol is related to the output voltage Vout; in another embodiment, the secondary side divided voltage Vo1 can be equal to the output voltage Vout (in this case the secondary side voltage divider circuit 111 can be omitted). In one embodiment, the secondary side reference voltage Vref is related to the target level of the output voltage Vout.

Figure 4:
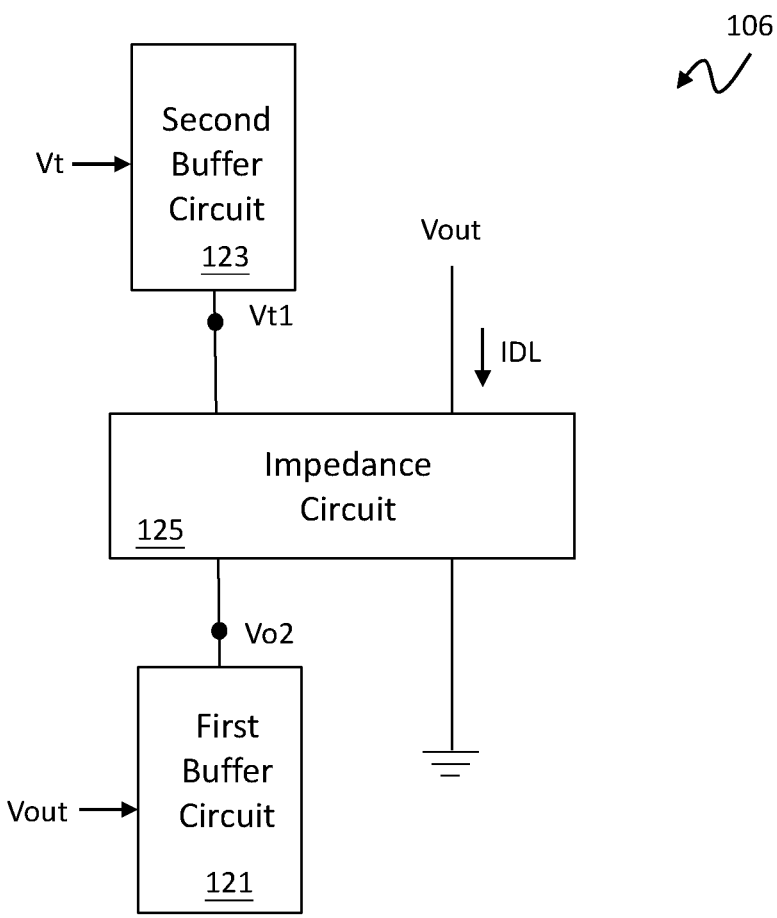
FIG. 4 shows an embodiment of a dummy load circuit.

Please refer to FIG. 4, which shows an embodiment of a dummy load circuit 106. As shown in FIG. 4, the dummy load circuit 106 includes: a first buffer circuit 121, a second buffer circuit 123 and an impedance circuit 125. The first buffer circuit 121 is configured to operably generate a dummy output voltage Vo2 according to the output voltage Vout. The second buffer circuit 123 is configured to operably generate a dummy reference voltage Vt1 according to the predetermined voltage threshold Vt. The impedance circuit 125 is coupled between the first buffer circuit 121 and the second buffer circuit 123. The impedance circuit 125 is configured to operably generate the dummy load current IDL according to a voltage difference between the dummy output voltage Vo2 and the dummy reference voltage Vt1. In one embodiment, the dummy output voltage Vo2 can be positively correlated with the output voltage Vout. In another embodiment, the dummy output voltage Vo2 can be equal to the output voltage Vout or the divided voltage of the output voltage Vout. The dummy reference voltage Vt1 can be correlated with the internal voltage threshold Vdth. The dummy output voltage Vo2 varies according to the output voltage Vout, to ensure that the internal voltage VDD remains not lower than the internal voltage threshold Vdth, and ensure no unnecessary waste of power. That is, the impedance circuit 125 can adaptively adjust the dummy load current IDL according to the voltage difference between the dummy output voltage Vo2 and the dummy reference voltage Vt1, so that the dummy load current IDL is raised when the output voltage Vout becomes smaller, and the dummy load current IDL is lowered when the output voltage Vout becomes higher. Consequently and desirably, the present invention can precisely control the power loss caused by the dummy load current IDL strictly as required.

Figure 5:
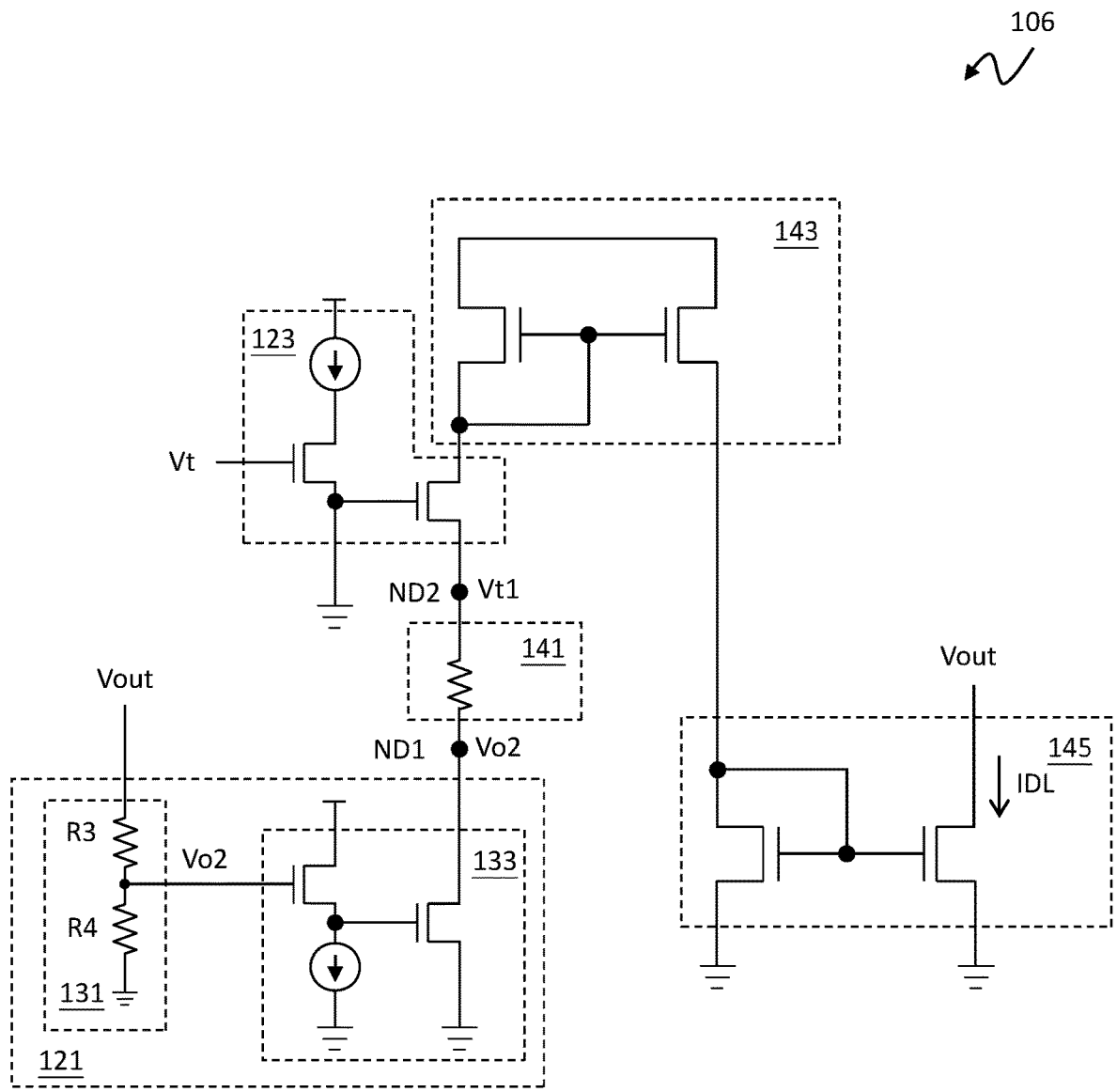
FIG. 5 shows a specific embodiment of a dummy load circuit.

Please refer to FIG. 5, which shows a specific embodiment of a dummy load circuit 106. As shown in FIG. 5, the dummy load circuit 106 includes: a first buffer circuit 121, a second buffer circuit 123 and an impedance circuit 125. The first buffer circuit 121 is configured to operably generate a dummy output voltage Vo2 according to the output voltage Vout. The second buffer circuit 123 is configured to operably generate a dummy reference voltage Vt1 according to the predetermined voltage threshold Vt. The impedance circuit 125 is coupled between the first buffer circuit 121 and the second buffer circuit 123. The impedance circuit 125 is configured to operably generate the dummy load current IDL according to a voltage difference between the dummy output voltage Vo2 and the dummy reference voltage Vt1.

The first buffer circuit 121 includes: a dummy voltage divider circuit 131 and a first unit gain buffer circuit 133. The dummy voltage divider circuit 131 includes a resistor R3 and a resistor R4, which are connected in series to each other. The dummy voltage divider circuit 131 is configured to operably generate a dummy output voltage Vo2 according to a divided voltage (of the output voltage Vout) at a voltage dividing node of the resistor R3 and the resistor R4. In one embodiment, the first unit gain buffer circuit 133 can include, for example but not limited to, switches and a current source as shown in FIG. 5. It should be understood that the implementation of the first unit gain buffer circuit 133 in the embodiment shown in FIG. 5 is only an illustrative example, but not for limiting the scope of the present invention. In other embodiments, it is also practicable and within the scope of the present invention that the first unit gain buffer circuit 133 can include, for example but not limited to, an operational amplifier circuit or its equivalents. The first unit gain buffer circuit 133 is coupled to the dummy voltage divider circuit 131 and is electrically connected to a first resistor terminal ND1 of the impedance circuit 125, whereby the first unit gain buffer circuit 133 provides the dummy output voltage Vo2 to the first resistor terminal ND1 of the impedance circuit 125. The first unit gain buffer circuit 133 is a unit gain buffer circuit having a voltage gain which is approximately equal to one and having a high input resistance. Unit gain buffer circuits are well known to those skilled in the art, so the details thereof are not redundantly explained here.

The second buffer circuit 123 can include, for example but not limited to, a second unit gain buffer circuit. In one embodiment, the second unit gain buffer circuit can include, for example but not limited to, switches and a current source as shown in FIG. 5. It should be understood that the implementation of the second unit gain buffer circuit in the embodiment shown in FIG. 5 is only an illustrative example, but not for limiting the scope of the present invention. In other embodiments, it is also practicable and within the scope of the present invention that the second unit gain buffer circuit can include, for example but not limited to, an operational amplifier circuit or its equivalents. The second unit gain buffer circuit is electrically connected to a second resistor terminal ND2 of the impedance circuit 125, whereby the second unit gain buffer circuit provides the dummy reference voltage Vt1 to a second resistor terminal ND2 of the impedance circuit 125. The second unit gain buffer circuit is also a unit gain buffer circuit having a voltage gain which is approximately equal to one and having a high input resistance. The impedance circuit 125 can include, for example but not limited to, a resistor 141, a current mirror circuit 143 and a current mirror circuit 145.

The resistor 141 has two terminals, which are the above-mentioned first resistor terminal ND1 and second resistor terminal ND2. In one embodiment, the resistor 141 has a constant resistance. The current mirror circuit 143 and the current mirror circuit 145 are coupled to the resistor 141. The current mirror circuit 143 and the current mirror circuit 145 are configured to operably generate the dummy load current IDL according to a current (which is a quotient of the voltage difference between the dummy output voltage Vo2 and the dummy reference voltage Vt1 divided by the resistance of the resistor 141) flowing through the resistor 141. The current mirror circuit 143 and the current mirror circuit 145 are current mirror circuits. Current mirror circuits are well known to those skilled in the art, so the details thereof are not redundantly explained here. Note that, in one embodiment, the current mirror circuit 145 is coupled to the output voltage Vout, to determine the feedback signal Sfb. The current mirror circuit 143 and the current mirror circuit 145 can be implemented in various manners, which are well known to those skilled in the art, so the details thereof are not redundantly explained here.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A flyback power converter circuit, comprising:
   a transformer including a primary winding, a secondary winding and an auxiliary winding, which are coupled to one another via electromagnetic induction, wherein the primary winding is electrically coupled to an input voltage;
   a primary side switch coupled to the primary winding, the primary side switch being configured to operably switch the primary winding, so as to convert the input voltage to an output voltage at the secondary winding and convert the input voltage to an internal voltage at the auxiliary winding;
   a primary side control circuit, which is powered by the internal voltage, the primary side control circuit being configured to operably generate a switching signal according to a feedback signal, to operate the primary side switch;
   a secondary side control circuit, which is configured to operably generate the feedback signal according to the output voltage; and
   a dummy load circuit, which is coupled to the output voltage, wherein when the output voltage drops to or is lower than a predetermined voltage threshold, the dummy load circuit is configured to operably generate a dummy load current flowing through the dummy load circuit, to determine the feedback signal, so that the internal voltage is not lower than an internal voltage threshold;
   wherein when the output voltage exceeds the predetermined voltage threshold, the dummy load circuit is configured to operably adjust the dummy load current to zero current.

2. The flyback power converter circuit of claim 1, wherein when the output voltage is lower than the predetermined voltage threshold, the dummy load circuit adaptively adjusts the dummy load current, to determine the feedback signal.

3. The flyback power converter circuit of claim 1, wherein the secondary side control circuit includes:
   a secondary side voltage divider circuit, which is connected in parallel with the dummy load circuit, wherein the secondary side voltage divider circuit and the dummy load circuit are commonly electrically connected to the output voltage, wherein the secondary side voltage divider circuit is configured to operably generate a secondary side divided voltage according to the output voltage; and
   a secondary side comparison circuit coupled to the secondary side voltage divider circuit, the secondary side comparison circuit being configured to operably compare the secondary side divided voltage with a secondary side reference voltage, to generate the feedback signal.

4. The flyback power converter circuit of claim 1, further comprising:
   a coupler circuit coupled between the primary side control circuit and the secondary side control circuit, wherein the coupler circuit is configured to operably convert the feedback signal to a coupled signal via a non-contact way, wherein the coupled signal is inputted to the primary side control circuit.

5. The flyback power converter circuit of claim 2, wherein the dummy load circuit includes:
   a first buffer circuit, which is configured to operably generate a dummy output voltage according to the output voltage;
   a second buffer circuit, which is configured to operably generate a dummy reference voltage according to the predetermined voltage threshold; and
   an impedance circuit coupled between the first buffer circuit and the second buffer circuit, wherein the impedance circuit is configured to operably generate the dummy load current according to a voltage difference between the dummy output voltage and the dummy reference voltage.

6. The flyback power converter circuit of claim 5, wherein the first buffer circuit includes:
   a dummy voltage divider circuit, which is configured to operably generate the dummy output voltage according to the output voltage; and
   a first unit gain buffer circuit coupled to the dummy voltage divider circuit, wherein first unit gain buffer circuit is configured to operably supply the dummy output voltage to a first terminal of the impedance circuit.

7. The flyback power converter circuit of claim 6, wherein the second buffer circuit includes:
   a second unit gain buffer circuit coupled to the impedance circuit, wherein the second unit gain buffer circuit is configured to operably supply the dummy reference voltage to a second terminal of the impedance circuit.

8. The flyback power converter circuit of claim 7, wherein the impedance circuit includes:
   a resistor having two terminals which are the first terminal and the second terminal; and
   a current mirror circuit coupled to the resistor, wherein the current mirror circuit is configured to operably generate the dummy load current according to a current flowing through the resistor.

9. A control circuit for use in a flyback power converter circuit, the control circuit being configured to operably control the flyback power converter circuit; the control circuit comprising:
   a primary side control circuit, which is powered by an internal voltage, the primary side control circuit being configured to operably generate a switching signal according to a feedback signal, to operate a primary side switch; wherein the primary side switch is coupled to a primary winding of a transformer, wherein the primary side switch is configured to operably switch the primary winding, so as to convert the input voltage to an output voltage at a secondary winding of the transformer and convert the input voltage to the internal voltage at an auxiliary winding of the transformer;

a secondary side control circuit, which is configured to operably generate the feedback signal according to the output voltage; and a dummy load circuit, which is coupled to the output voltage, wherein when the output voltage drops to or is lower than a predetermined voltage threshold, the dummy load circuit is configured to operably generate a dummy load current flowing through the dummy load circuit, to determine the feedback signal, so that the internal voltage is not lower than an internal voltage threshold;

wherein when the output voltage exceeds the predetermined voltage threshold, the dummy load circuit is configured to operably adjust the dummy load current to zero current.

10. The control circuit of claim 9, wherein when the output voltage is lower than the predetermined voltage threshold, the dummy load circuit adaptively adjusts the dummy load current, to determine the feedback signal.

11. The control circuit of claim 9, wherein the secondary side control circuit includes:

a secondary side voltage divider circuit, which is connected in parallel with the dummy load circuit, wherein the secondary side voltage divider circuit and the dummy load circuit are commonly electrically connected to the output voltage, wherein the secondary side voltage divider circuit is configured to operably generate a secondary side divided voltage according to the output voltage; and a secondary side comparison circuit coupled to the secondary side voltage divider circuit, the secondary side comparison circuit being configured to operably compare the secondary side divided voltage with a secondary side reference voltage, to generate the feedback signal.

12. The control circuit of claim 9, further comprising:

a coupler circuit coupled between the primary side control circuit and the secondary side control circuit, wherein the coupler circuit is configured to operably convert the feedback signal to a coupled signal via a non-contact way, wherein the coupled signal is inputted to the primary side control circuit.

13. The control circuit of claim 10, wherein the dummy load circuit includes:

a first buffer circuit, which is configured to operably generate a dummy output voltage according to the output voltage;

a second buffer circuit, which is configured to operably generate a dummy reference voltage according to the predetermined voltage threshold; and an impedance circuit coupled between the first buffer circuit and the second buffer circuit, wherein the impedance circuit is configured to operably generate the dummy load current according to a voltage difference between the dummy output voltage and the dummy reference voltage.

14. The control circuit of claim 13, wherein the first buffer circuit includes:

a dummy voltage divider circuit, which is configured to operably generate the dummy output voltage according to the output voltage; and a first unit gain buffer circuit coupled to the dummy voltage divider circuit, wherein first unit gain buffer circuit is configured to operably supply the dummy output voltage to a first terminal of the impedance circuit.

15. The control circuit of claim 14, wherein the second buffer circuit includes:

a second unit gain buffer circuit coupled to the impedance circuit, wherein the second unit gain buffer circuit is configured to operably supply the dummy reference voltage to a second terminal of the impedance circuit.

16. The control circuit of claim 15, wherein the impedance circuit includes:

a resistor having two terminals which are the first terminal and the second terminal; and a current mirror circuit coupled to the resistor, wherein the current mirror circuit is configured to operably generate the dummy load current according to a current flowing through the resistor.

17. A control method for controlling a flyback power converter circuit; the control method comprising:

generating a switching signal according to a feedback signal, to operate a primary side switch; wherein the primary side switch is coupled to a primary winding of a transformer, wherein the primary side switch is configured to operably switch the primary winding, so as to convert an input voltage to an output voltage at a secondary winding of the transformer and convert the input voltage to an internal voltage at an auxiliary winding of the transformer;

generating the feedback signal according to the output voltage;

when the output voltage drops to or is lower than a predetermined voltage threshold, generating a dummy load current, to determine the feedback signal, so that the internal voltage is not lower than an internal voltage threshold; and when the output voltage exceeds the predetermined voltage threshold, adjusting the dummy load current to zero current.

18. The control method of claim 17, wherein when the output voltage is lower than the predetermined voltage threshold, the feedback signal is determined through adaptively adjusting the dummy load current.

19. The control method of claim 17, further comprising:

converting the feedback signal to a coupled signal via a non-contact way, to generate the switching signal.

20. The control method of claim 17, wherein the step of generating a dummy load current when the output voltage is lower than the predetermined voltage threshold includes:

generating a dummy output voltage according to the output voltage;

generating a dummy reference voltage according to the predetermined voltage threshold; and generating the dummy load current according to a voltage difference between the dummy output voltage and the dummy reference voltage.

* * * * *